United States Patent
Chillar et al.

(10) Patent No.: US 9,019,108 B2
(45) Date of Patent: Apr. 28, 2015

(54) THERMAL MEASUREMENT SYSTEM FOR FAULT DETECTION WITHIN A POWER GENERATION SYSTEM

(75) Inventors: Rahul Jaikaran Chillar, Marietta, GA (US); Eric J. Kauffman, Marietta, GA (US); Adil Ansari, Kennesaw, GA (US)

(73) Assignee: General Electric Company, Schenectady, NY (US)

( * ) Notice: Subject to any disclaimer, the term of this patent is extended or adjusted under 35 U.S.C. 154(b) by 1186 days.

(21) Appl. No.: 12/850,777

(22) Filed: Aug. 5, 2010

(65) Prior Publication Data
US 2012/0032810 A1 Feb. 9, 2012

(51) Int. Cl.
| G08B 17/12 | (2006.01) |
| G01K 13/00 | (2006.01) |
| G01J 5/00 | (2006.01) |
| G01J 5/08 | (2006.01) |
| G01M 3/00 | (2006.01) |

(52) U.S. Cl.
CPC ............. *F01K 13/003* (2013.01); *G01J 5/0014* (2013.01); *G01J 5/0088* (2013.01); *G01J 5/0806* (2013.01); *G01J 5/0862* (2013.01); *G01M 3/002* (2013.01)

(58) Field of Classification Search
CPC ..... G01J 5/006; G01J 5/0896; G01J 5/10044; G01J 5/0037; G01J 5/0014; G01J 5/12; G01J 5/0088
USPC .................. 340/600, 500, 540, 605
See application file for complete search history.

(56) References Cited

U.S. PATENT DOCUMENTS

| 3,664,942 A * | 5/1972 | Havas et al. ............. 204/192.33 |
| 3,719,071 A | 3/1973 | Hohenburg |
| 3,771,350 A | 11/1973 | Romans |
| 4,058,975 A | 11/1977 | Gilbert et al. |
| 4,655,607 A | 4/1987 | Kern et al. |
| 4,710,095 A | 12/1987 | Freberg et al. |
| 4,874,253 A | 10/1989 | Pompei et al. |
| 5,099,121 A | 3/1992 | Allen |
| 5,308,162 A | 5/1994 | Amano et al. |
| 5,336,996 A | 8/1994 | Rusnak |
| 5,385,202 A | 1/1995 | Drosdziok et al. |
| 5,883,815 A | 3/1999 | Drakulich et al. |
| 6,031,231 A | 2/2000 | Kimata et al. |
| 6,269,626 B1 | 8/2001 | Kim |

(Continued)

FOREIGN PATENT DOCUMENTS

| CN | 1454310 A | 11/2003 |
| CN | 201155995 Y | 11/2008 |

(Continued)

OTHER PUBLICATIONS

U.S. Appl. No. 12/850,793, filed Aug. 5, 2010, Chillar et al.

(Continued)

*Primary Examiner* — Brian Zimmerman
*Assistant Examiner* — Sara Samson
(74) *Attorney, Agent, or Firm* — Fletcher Yoder, P.C.

(57) ABSTRACT

A system includes a radiation sensor configured to direct a field of view toward a conduit within a heat recovery steam generator, and to output a signal indicative of a temperature of the conduit. The system also includes a controller communicatively coupled to the radiation sensor. The controller is configured to determine the temperature based on the signal, and to compare the temperature to a threshold value.

14 Claims, 5 Drawing Sheets

(56) References Cited

U.S. PATENT DOCUMENTS

| | | | |
|---|---|---|---|
| 6,422,745 | B1 | 7/2002 | Glasheen et al. |
| 6,644,095 | B2 | 11/2003 | Van Mullekom et al. |
| 6,748,733 | B2 | 6/2004 | Tamaro |
| 6,931,352 | B2 | 8/2005 | Cryer et al. |
| 6,931,857 | B2 | 8/2005 | Irwin et al. |
| 6,962,043 | B2 | 11/2005 | Venkateswaran et al. |
| 6,983,603 | B2 | 1/2006 | Macchia |
| 7,231,307 | B2 | 6/2007 | Takei et al. |
| 7,322,359 | B2 | 1/2008 | Ketchum |
| 7,332,716 | B2 | 2/2008 | Hamrelius et al. |
| 7,422,365 | B2 | 9/2008 | Chamberlain et al. |
| 7,484,369 | B2 | 2/2009 | Myhre |
| 7,552,633 | B2 | 6/2009 | Tokuyasu et al. |
| 7,617,686 | B2 | 11/2009 | Lilley et al. |
| 7,974,739 | B2 | 7/2011 | Nelson et al. |
| 8,167,483 | B2 * | 5/2012 | Jensen .................. 374/120 |
| 2004/0076218 | A1 | 4/2004 | Tomlinson et al. |
| 2006/0069532 | A1* | 3/2006 | Takei et al. ............ 702/191 |
| 2006/0076426 | A1* | 4/2006 | Schuetze et al. .......... 237/12 |
| 2006/0220888 | A1* | 10/2006 | Germouni et al. ........ 340/605 |
| 2007/0251663 | A1 | 11/2007 | Sheldon et al. |
| 2008/0166489 | A1 | 7/2008 | Strock et al. |
| 2008/0298957 | A1 | 12/2008 | Chillar et al. |
| 2009/0055071 | A1 | 2/2009 | Way et al. |
| 2009/0056910 | A1 | 3/2009 | Mallia et al. |
| 2009/0129436 | A1 | 5/2009 | Glehr et al. |
| 2009/0272122 | A1 | 11/2009 | Shi et al. |
| 2009/0282803 | A1 | 11/2009 | Bono et al. |
| 2009/0285259 | A1 | 11/2009 | Allen et al. |
| 2010/0143090 | A1 | 6/2010 | Smith et al. |
| 2011/0240858 | A1 | 10/2011 | Estevadeordal et al. |

FOREIGN PATENT DOCUMENTS

| | | |
|---|---|---|
| CN | 101360982 A | 2/2009 |
| EP | 2208977 A2 | 7/2010 |
| JP | 61181921 | 8/1986 |
| JP | 8296453 | 11/1996 |
| JP | 2004170375 | 6/2004 |
| WO | WO0122045 | 3/2001 |
| WO | 2004097389 A2 | 11/2004 |

OTHER PUBLICATIONS

U.S. Appl. No. 12/850,770, filed Aug. 5, 2010, Chillar et al.
U.S. Appl. No. 12/718,932, filed Mar. 5, 2010, Ansari et al.
U.S. Appl. No. 12/772,601, filed May 3, 2010, Chillar et al.
U.S. Appl. No. 12/772,626, filed May 3, 2010, Ansari et al.
Infrared Detectors by A. Rogalski, published in FY 2000.
Search Report from corresponding EP Application No. 11156999.2 dated Sep. 5, 2011.
Unofficial English Translation of Chinese Office Action issued in connection with corresponding CN Application No. 201110230190.2 on Jun. 11, 2014.
European Search Report; Application No. EP11175432.1; Dated Dec. 11, 2014; 7 pages
Chinese Office Action; Application No. CN201110230294.3; Dated Feb. 25, 2015; 6 pages.

* cited by examiner

THERMAL MEASUREMENT SYSTEM FOR FAULT DETECTION WITHIN A POWER GENERATION SYSTEM

BACKGROUND OF THE INVENTION

The disclosed subject matter relates to a thermal measurement system for fault detection within a power generation system.

Certain power generation systems include a gas turbine engine configured to combust a mixture of fuel and compressed air to produce hot combustion gases. The combustion gases may flow through a turbine to generate power for a load, such as an electric generator. To enhance efficiency, certain power generation systems employ a heat recovery steam generator (HRSG) to capture energy from the hot combustion gases exhausted from the turbine. In general, HRSGs convey a fluid, such as water, through multiple conduits in a direction crosswise (e.g., substantially perpendicular) to the flow of exhaust gas. As the exhaust gas flows across the conduits, heat is transferred from the exhaust gas to the water, thereby producing steam. The steam is then directed through a steam turbine to generate rotational motion, thereby driving a load, such as an electric generator. Certain HRSGs include conduits having fins configured to increase heat transfer between the exhaust gas and the water flow through the conduits. Unfortunately, separation of the fins from the conduits may decrease HRSG efficiency. In addition, if a portion of the exhaust flow is warmer than desired, certain conduits may experience excessive steam pressure, thereby resulting in premature wear of certain HRSG components.

Furthermore, certain power generation systems include a switchgear configured to regulate operation of various electrical systems, such as electrical output from the generators and/or an electrical starter motor for the gas turbine engine. Due to the high voltage and amperage passing through the switchgear, the switchgear is typically scanned with an infrared camera prior to activation of the power generation system. For example, a technician may open each electrical enclosure of the switchgear, and then direct the infrared camera toward an interior of each enclosure to ensure that the temperature is within a desired limit. Because an excessive temperature may be indicative of an electrical short or a loose connection within the switchgear, corrective action may be taken if an excessive temperature is detected. Unfortunately, the process of manually scanning the switchgear is expensive and time-consuming, thereby increasing the operational costs of the power generation system.

In addition, certain power generation systems include a generator step-up transformer (GSU) to increase the generator voltage to a desired level for power transmission. The GSU is electrically coupled to the generator via an electrical connection, such as an isolated phase bus. In general, the isolated phase bus includes three electrical conduits configured to individually transfer each phase of the three-phase power output by the generator to the GSU. Each electrical conduit of the isolated phase bus typically includes an electrical conductor assembly disposed within an enclosure. The electrical conductor assembly is electrically isolated from the enclosure by a series of insulators which also serve to support the electrical conductor assembly within the enclosure. The electrical conductor assembly includes a series of conductors coupled to one another by fasteners, for example. As will be appreciated, the electrical conductors may separate from one another over time, thereby generating heat at the junction between conductors. Consequently, the power transfer efficiency of the isolated phase bus may be substantially reduced, thereby decreasing the efficiency of the power generation system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a radiation sensor configured to direct a field of view toward a conduit within a heat recovery steam generator, and to output a signal indicative of a temperature of the conduit. The system also includes a controller communicatively coupled to the radiation sensor. The controller is configured to determine the temperature based on the signal, and to compare the temperature to a threshold value.

In a second embodiment, a system includes a radiation sensor configured to direct a field of view toward an interior of an electrical enclosure containing multiple components, and to output a signal indicative of a temperature of the interior of the electrical enclosure. The system also includes a controller communicatively coupled to the radiation sensor. The controller is configured to detect an electrical fault among the components based on the signal.

In a third embodiment, a system includes a radiation sensor configured to direct a field of view toward a region including at least one junction between multiple electrical conductors, and to output a signal indicative of a temperature of the region. The system also includes a controller communicatively coupled to the radiation sensor. The controller is configured to detect separation of the electrical conductors at the at least one junction based on the signal.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain embodiments of the present disclosure may facilitate HRSG maintenance operations by identifying conditions that may result in decreased HRSG efficiency and/or premature wear of HRSG components. For example, certain power generation systems may include a thermal measurement system having a radiation sensor with a field of view directed toward a conduit within the HRSG. The radiation sensor is configured to detect thermal radiation emitted by the conduit and to output a signal indicative of a temperature of the conduit. The thermal measurement system may also include a controller communicatively coupled to the radiation sensor, and configured to determine the temperature of the conduit based on the signal. The controller may also be configured to compare the temperature to a threshold value to identify a fault within the conduit. For example, an excessively high conduit temperature may over-pressurize the conduit, thereby resulting in premature wear of the conduit and/or other components within the HRSG. Furthermore, an excessively low conduit temperature may be indicative of at least partial separation of fins from the conduit, buildup of debris on the surface of the conduit and/or fluid leakage from the conduit. Consequently, the thermal measurement system is configured to continuously monitor each conduit within the HRSG to detect such faults, and alert an operator and/or automatically take appropriate corrective action. In this manner, conditions which may decrease efficiency of the HRSG may be readily identified, thereby facilitating HRSG maintenance operations and increasing HRSG efficiency.

Further embodiments of the present disclosure may significantly decrease the costs associated with detecting electrical faults within the switchgear. For example, certain power generation systems may include a thermal measurement system having a radiation sensor with a field of view directed toward an interior of an electrical enclosure containing multiple components. The radiation sensor is configured to detect thermal radiation emitted by the components and to output a signal indicative of a temperature of the interior of the electrical enclosure. The thermal measurement system may also include a controller communicatively coupled to the radiation sensor, and configured to detect an electrical fault among the components based on the signal. Because the thermal measurement system is configured to continuously monitor the temperature of the switchgear and to automatically identify an electrical fault based on the temperature, manually scanning the switchgear with a hand-held infrared camera prior to activating the power generation system may be obviated. Consequently, the operational costs associated with startup operations may be significantly reduced. In addition, electrical faults may be detected during operation of the power generation system, not just during startup procedures.

Yet further embodiments of the present disclosure may detect a decrease in transfer efficiency within an electrical bus by monitoring the temperature of a junction between electrical conductors within the bus. For example, certain power generation systems may include a thermal measurement system having a radiation sensor with a field of view directed toward a region including at least one junction between multiple electrical conductors. The radiation sensor is configured to detect thermal radiation emitted by the junction and to output a signal indicative of a temperature of the region. The thermal measurement system may also include a controller communicatively coupled to the radiation sensor, and configured to detect separation of the electrical conductors at the at least one junction based on the signal. Because the thermal measurement system is configured to continuously monitor the temperature of the junction and to automatically identify conductor separation based on the temperature, a decrease in transfer efficiency through the electrical bus may be quickly identified. Consequently, rerouting electrical power as soon as the separation is detected may ensure efficient operation of the power generation system.

Figure 1:
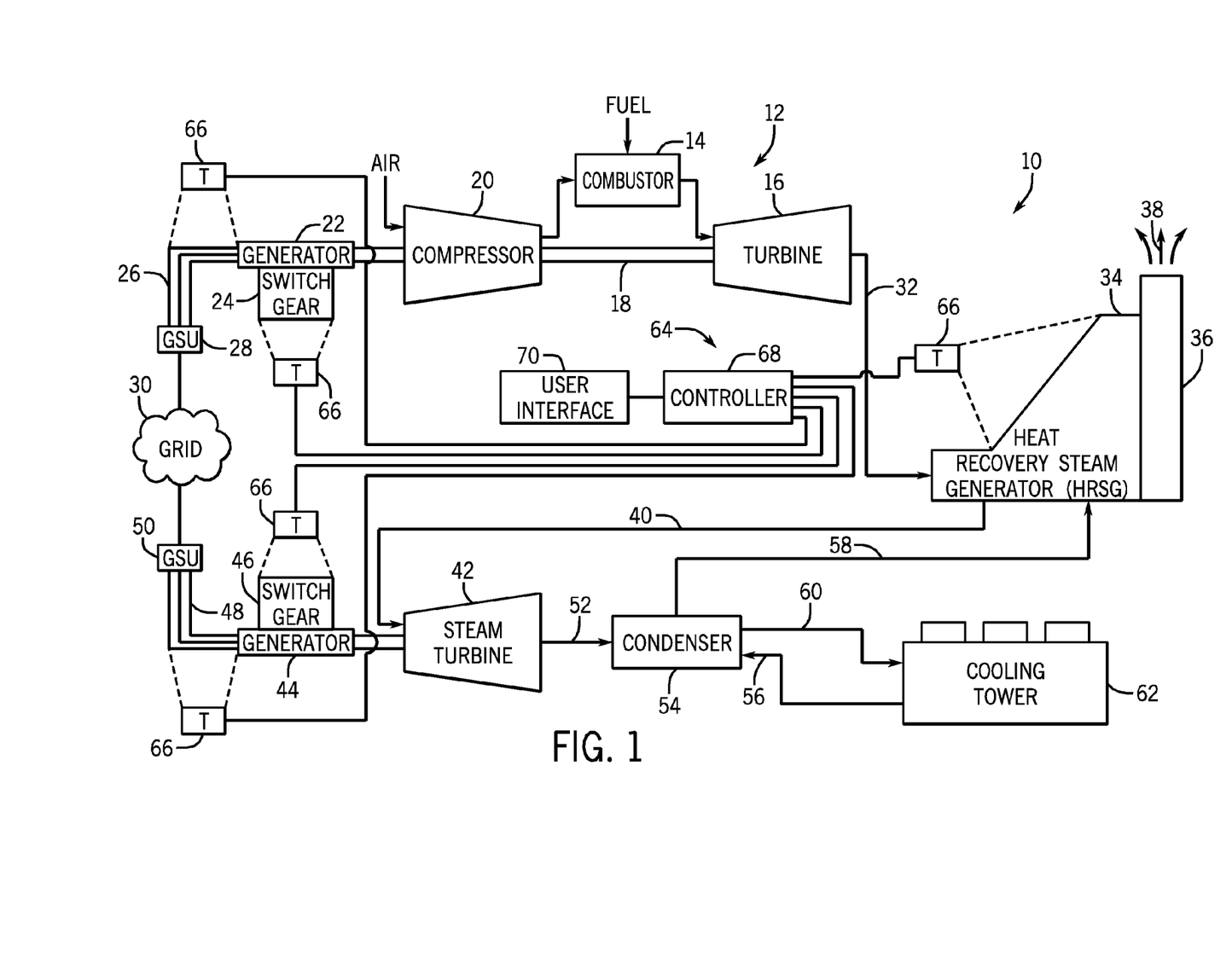
FIG. 1 is a schematic diagram of an embodiment of a combined cycle power generation system having a gas turbine, an HRSG, a switchgear, an isolated phase bus and a thermal measurement system configured to detect the temperature within the HRSG, switchgear and isolated phase bus.

FIG. 1 is a schematic diagram of an embodiment of a combined cycle power generation system 10 having a gas turbine, an HRSG, a switchgear, an isolated phase bus and a thermal measurement system configured to detect the temperature within the HRSG, switchgear and isolated phase bus. The system 10 is described below for the purpose of providing context for embodiments of a thermal measurement system configured to detect a fault within various electrical systems and fluid conduits. It should be appreciated that the thermal measurement system described below may be utilized for detecting faults within other power generation systems, turbine systems, processing plants, or any other system including an HRSG, switchgear, or an electrical bus. In the present embodiment, the system 10 includes a gas turbine engine 12 including a combustor 14, a turbine 16, a drive shaft 18, and a compressor 20. The combustor 14 receives fuel, such as natural gas, which may be injected under pressure from fuel nozzles. This fuel is mixed with compressed air and combusted within the combustor 14, thereby generating hot pressurized exhaust gases. The combustor 14 directs the exhaust gases toward an exhaust outlet of the turbine 16. As the exhaust gases from the combustor 14 pass through the turbine 16, blades in the turbine 16 are driven to rotate, thereby rotating the drive shaft 18 along an axis of the gas turbine engine 12. As illustrated, the drive shaft 18 may be connected to various components of the gas turbine engine 12, including the compressor 20.

The drive shaft 18 connects the turbine 16 to a rotor of the compressor 20 which includes blades. Thus, rotation of turbine blades in the turbine 16 causes the drive shaft 18 connecting the turbine 16 to the compressor 20 to rotate blades within the compressor 20. The rotation of blades in the compressor 20 causes the compressor 20 to compress air received via an air intake. The compressed air is then fed to the combustor 14 and mixed with fuel to facilitate combustion. The drive shaft 18 is also connected to a generator 22 for producing electrical power. As illustrated, a switchgear 24 is coupled to the generator 22 and configured to regulate certain functions of the power generation system 10, such as electrical power output from the generator 22 and/or startup of the gas turbine engine 12, among other functions. As discussed in detail below, the switchgear 24 contains various components, including switches and circuit breakers, to regulate the power generation system functions.

In the present embodiment, an isolated phase bus 26 electrically couples the generator 22 to a generator step-up transformer (GSU) 28. The GSU 28 is configured to increase the generator voltage to a desired level for power transmission through an electrical distribution grid 30. Furthermore, as illustrated, the isolate phase bus 26 includes three electrical conduits configured to individually transfer each phase of the three-phase power output by the generator 22 to the GSU 28. Each electrical conduit of the isolated phase bus 26 includes an electrical conductor assembly disposed within an enclosure. The electrical conductor assembly is electrically isolated from the enclosure by a series of insulators which also serve to support the electrical conductor assembly within the enclosure. The electrical conductor assembly includes a series of conductors coupled to one another by fasteners, for example. While an isolated phase bus 26 is employed in the present embodiment to transfer electrical power from the generator 22 to the GSU 28, it should be appreciated that other electrical buses may be utilized in alternative embodiments.

Exhaust gas 32 from the gas turbine engine 12 is directed to an HRSG 34. As discussed in detail below, the HRSG 34 is a heat exchanger which includes multiple conduits configured to convey a secondary fluid, such as water, in a direction crosswise (e.g., substantially perpendicular) to the flow of exhaust gas 32 through the HRSG 34. As the exhaust gas 32 flows across the conduits, heat is transferred from the exhaust gas to the water, thereby producing steam. In addition, the temperature of the exhaust gas is significantly reduced. After passing through the HRSG 34, the cooled exhaust gas is released to the atmosphere through a stack 36, as indicated by the arrows 38. As illustrated, the generated steam 40 is directed toward a steam turbine 42.

As the high pressure steam 40 passes through the steam turbine 42, blades within the turbine 42 are driven to rotate, thereby driving a second generator 44. While the present embodiment includes two generators 22 and 44, it should be appreciated that the gas turbine engine 12 and the steam turbine 42 may be coupled to the same load in alternative embodiments. As illustrated, a second switchgear 46 is coupled to the second generator 44 to regulate output of the second generator 44. In addition, a second isolated phase bus 48 and a second GSU 50 serve to convey electrical power output from the second generator 44 to the electrical distribution grid 30.

As the steam passes through the steam turbine 42, the pressure is reduced such that low pressure steam 52 is expelled from the turbine 42. As illustrated, the low pressure steam 52 flows into a condenser 54 which condenses the steam. Similar to the HRSG 34, the condenser 54 is a heat exchanger which includes multiple conduits configured to convey a secondary fluid, such as water, in a direction crosswise (e.g., substantially perpendicular) to the flow of steam. As the steam flows across the conduits, heat from the steam is transferred to water 56, thereby condensing the steam into water 58. The water 58 flows back to the HRSG 34 where it is heated by the exhaust gas 32 to produce more high pressure steam 40. The cooling water 56 is heated within the condenser 54 and exits as hot water 60. The hot water 60 is directed toward a cooling tower 62 which cools the hot water 60 to produce cool water 56 for the condenser 54.

As illustrated, the power generation system 10 includes a thermal measurement system 64 configured to determine a temperature within the HRSG 34, the switchgears 24 and 46 and/or the isolated phase buses 26 and 48. In the present embodiment, the thermal measurement system 64 includes five radiation sensors, such as the illustrated thermal radiation sensors 66, each directed toward a respective target component of the power generation system 10. Specifically, one thermal radiation sensor 66 is directed toward a conduit within the HRSG 34 to determine a temperature of the conduit. In addition, second and third thermal radiation sensors 66 are directed toward the switchgears 24 and 46 to detect an electrical fault based on the measured temperature of the switchgear components. Furthermore, fourth and fifth thermal radiation sensors 66 are directed toward the isolated phase buses 26 and 48 to detect separation of electrical conductors based on the measured temperature of a junction within an isolated phase bus conduit. In the present embodiment, the thermal radiation sensors 66 are configured to output a signal indicative of a temperature of the target object. For example, as discussed in detail below, each thermal radiation sensor 66 may be a thermopile configured to output a temperature based on the detected thermal radiation. In certain embodiments, the thermal radiation sensors 66 may include an array of thermopile elements, thereby establishing a multi-dimensional (e.g., two-dimensional or three-dimensional) temperature profile of the target object. By monitoring the temperature within various power generation system components, the thermal measurement system 64 may detect faults within the components, thereby facilitating maintenance operations.

As will be appreciated, the thermal radiation sensor 66 measures electromagnetic energy from an object to determine a temperature of the object. For example, the sensor 66 may measure thermal radiation having a wavelength within an infrared spectrum. As discussed in detail below, the intensity of certain infrared emissions may be proportional to the temperature of the object. In certain embodiments, the thermal radiation sensor 66 is configured to detect such emissions and output a signal indicative of temperature. It also should be appreciated that various thermal radiation sensor configurations may be employed to determine the temperature of a component within the power generation system 10. As previously discussed, certain sensors 66 may include a thermopile or series of thermopile elements. As will be appreciated, a thermopile includes multiple thermocouples connected in series to obtain an enhanced signal output. Thermocouples measure the temperature difference between hot and cold junctions by generating an electromotive force (emf) between the junctions. For example, the hot junctions may be directed toward the object to measure thermal radiation, and the cold junctions may be coupled to a heat sink such that a temperature of the cold junctions is substantially equal to the ambient temperature. Because the thermocouples are connected in series, the thermopile sums the emf of all the thermocouples to provide an enhanced voltage output. Establishing an array of thermopile elements may generate a two-dimensional or three-dimensional temperature profile of the target object, with each thermopile element providing a temperature of a respective monitored region. In certain embodiments, the thermopile or thermopile array may be a single solid state device, with the thermopile or thermopile elements formed on the surface of the device. Alternative embodiments may employ radiation pyrometers, infrared detectors (e.g., charge-coupled device (CCD), focal-plane array (FPA), etc.) or other thermal radiation sensors configured to output a temperature of the target object.

In the present embodiment, each thermal radiation sensor 66 is communicatively coupled to a controller 68. The controller 68 is configured to determine a temperature of the target object based on the signal output by the thermal radiation sensor 66. In certain embodiments, the thermal radiation sensor 66 is a thermopile configured to output a signal indicative of an average temperature of the target object. In such embodiments, the controller 68 may be configured to compare the average temperature to a threshold value to identify a fault within the target object. For example, if the controller 68 determines that the temperature of a conduit within the HRSG 34 is below a first threshold value, the controller 68 may determine that the conduit is damaged (e.g., leaking fluid, detached fins, etc.). Conversely, if the controller 68 determines that the temperature of the conduit is above a second threshold value, the controller 68 may determine that the conduit is over-pressurized, thereby potentially decreasing the operational life of the conduit. In addition, if the controller 68 determines that the temperature of the switchgear 24 or 46 is above a threshold value, an electrical fault may be present among the components of the switchgear 24 or 46. Furthermore, if the controller determines that the temperature of a junction between conductors within a conduit of the isolated phase bus 26 or 48 is above a threshold value, the conductors may have become separated, thereby decreasing transfer efficiency of electrical power through the isolated phase bus 26 or 48. In further embodiments, the thermal radiation sensor 66 includes multiple thermopile elements forming a thermopile array. In such embodiments, the sensor 66 may output a signal indicative of a multi-dimensional temperature profile (e.g., two-dimensional or three-dimensional profile) of the target object, thereby providing additional temperature information to the controller 68.

While a single thermal radiation sensor 66 is directed toward each component of the power generation system 10 (e.g., HRSG 34, switchgear 24 or 46, and isolated phase bus 26 or 48) in the present embodiment, it should be appreciated that multiple sensors 66 may be employed in alternative embodiments to monitor various areas of each component. For example, multiple thermal radiation sensors 66 may be directed toward various conduits of the HRSG 34. In addition, one or more thermal radiation sensors 66 may be directed toward the interior of each electrical enclosure within the switchgear 24 or 46. Furthermore, one or more thermal radiation sensors 66 may be directed toward each conduit within the isolated phase bus 26 or 48.

The present embodiment also includes a user interface 70 communicatively coupled to the controller 68. The user interface 70 may include a numerical display configured to display the temperature detected by each thermal radiation sensor 66 and/or a graphical interface configured to display the temperature as a function of time. In this manner, an operator may monitor the temperature profile to determine if the temperature is outside of a threshold range. In addition, the user interface 70 may include a visual and/or audible alarm configured to alert the operator if an excessively high or excessively low temperature is detected. For example, if the controller 68 determines that the temperature of a conduit within the HRSG 34 is below a first threshold value or above a second threshold value, the audible and/or visual alarm may be activated. In certain embodiments, the controller 68 is communicatively coupled to the gas turbine system 10, and configured to automatically reduce or terminate fluid flow through the HRSG 34 in response to detection of an excessive temperature. For example, the controller 68 may adjust the flow path of the exhaust gas 32 such that the gas bypasses the HRSG 34. In addition, the controller 68 may disable operation of the power generation system 10 and/or reroute power through an alternate isolated phase bus if separation of conductors within the isolated phase bus 26 or 48 is detected. Similarly, the controller 68 may disable operation of the power generation system 10 and/or reroute electrical control through an alternative switchgear if an electrical fault is detected within the switchgear 24 or 46.

Figure 2:
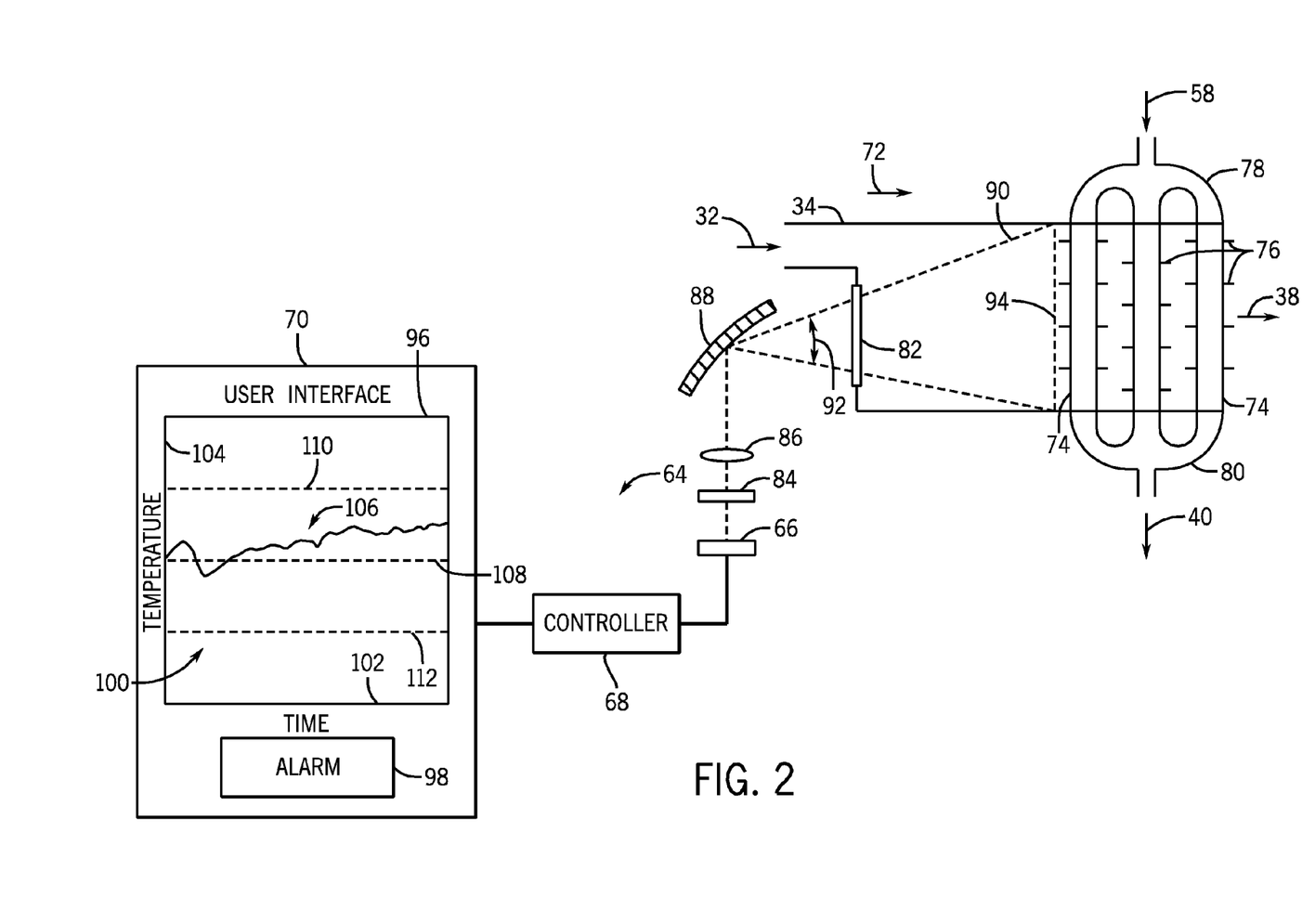
FIG. 2 is a schematic diagram of an embodiment of the thermal measurement system directed toward a fluid conduit within the HRSG.

FIG. 2 is a schematic diagram of an embodiment of the thermal measurement system 64 directed toward a fluid conduit within the HRSG 34. As illustrated, the exhaust gas 32 flows into the HRSG 34 in a downstream direction 72. The HRSG 34 includes multiple conduits 74 configured to convey a secondary fluid, such as water, in a direction crosswise (e.g., substantially perpendicular) to the downstream direction 72. As the exhaust gas 32 flows across the conduits 74, heat is transferred from the exhaust gas 32 to the water, thereby producing steam. As illustrated, the conduits 74 include fins 76 configured to enhance heat transfer between the exhaust gas 32 and the water. In certain embodiments, the fins 76 may be coupled to the conduits 74 by an interference fit. For example, circular fins 76 having an inner diameter slightly larger than the outer diameter of the conduit 74 may be positioned at desired locations along the conduit 74. A ball bearing may then be forced through the conduit 74, causing the conduit 74 to expand to a diameter greater than the inner diameter of the fins 76. As a result, the fins 76 will be substantially rigidly coupled to the conduit 74. While the present embodiment employs circular fins, it should be appreciated that alternative fin configurations (e.g., polygonal, elliptical, etc.) may be employed in alternative embodiments. In addition, the fins 76 may be coupled to the conduits 74 by other techniques (e.g., welding, fastening, etc.) in alternative embodiments. Furthermore, while four fins 76 are coupled to each conduit 74 in the present embodiment, it should be appreciated that substantially more fins 76 may be employed in alternative embodiments. For example, certain HRSG configurations may employ 1, 2, 3, 4, 5, or more fins 76 per inch along the length of the conduits 74.

In the present embodiment, the water 58 is supplied to the conduits 74 by a first manifold 78, and the steam 40 is expelled through a second manifold 80. As previously discussed, the steam 40 is directed toward the steam turbine 42 to drive the generator 44, while the cooled exhaust gas is directed toward the stack 36. While three conduits 74 are employed within the illustrated HRSG 34, it should be appreciated that significantly more conduits may be utilized within other HRSG configurations. In certain embodiments, the conduits 74 may be distributed along the downstream direction 72, and along a direction perpendicular to the flow path. In further embodiments, the HRSG 34 may include multiple stages, with each stage configured to generate steam for a separate steam turbine. While the illustrated thermal radiation sensor 66 is directed toward an upstream conduit 74, it should be appreciated that the other conduits 74 within the HRSG 34 may be monitored in alternative embodiments.

In the illustrated configuration, the thermal radiation sensor 66 is positioned outside of the HRSG 34, thereby protecting the thermal measurement system 64 from the hot exhaust gas 32 passing through the HRSG 34. As illustrated, the HRSG 34 includes a viewing port 82 configured to enable the thermal radiation sensor 66 to receive thermal radiation emitted by the conduit 74 within the HRSG 34. As will be appreciated, the viewing port 82 may be composed of a material that is substantially transparent to the wavelengths measured by the thermal radiation sensor 66. For example, if the sensor 66 is configured to monitor thermal radiation within an infrared spectrum, the viewing port 82 may be composed of a material substantially transparent to infrared radiation, such as Germanium or Silicon, for example. As will be appreciated, selection of the material may also be dependent on the expected temperature of the fluid flow through the HRSG 34. In certain embodiments, the viewing port 82 may be exposed to fluid temperatures in excess of approximately, 500, 600, 700, 800, 900, 1000, 1120 or 1200 degrees Celsius, or more.

Consequently, the transparent material may be selected to resist such temperatures. Because the viewing port 82 enables the sensor 66 to be positioned outside of the HRSG 34, the thermal radiation sensor 66 may measure a temperature of the conduits 74 within the HRSG 34 without exposure to hot exhaust gas, thereby substantially extending the operational life of the sensor 66.

In the present embodiment, a filter 84 and a lens 86 are positioned between the viewing port 82 and the thermal radiation sensor 66. In certain embodiments, the sensor 66 may be a thermopile configured to measure the thermal radiation emitted by the conduits 74. In such embodiments, the thermopile includes multiple thermocouples electrically connected in series to provide an enhanced output signal. As will be appreciated, the thermopile may detect a variety of thermal radiation wavelengths. For example, certain thermopiles may detect electromagnetic wavelengths within the infrared spectrum ranging from approximately 0.8 to 40 microns. As will be further appreciated, a particular subset of wavelengths within the infrared spectrum may be well-suited for temperature determination. Consequently, a band-pass filter 84 may be employed to limit the range of wavelengths incident upon the sensor 66. For example, in certain embodiments, the band-pass filter 84 may be configured to block electromagnetic radiation having a wavelength outside of a range between approximately 2 to 20, 4 to 18, 6 to 16, 8 to 14, or about 7.2 to 12.4 microns. Consequently, the filter 84 facilitates passages of thermal radiation onto the sensor 66 having a wavelength range suitable for the thermopile to output a signal having a magnitude proportional to the measured temperature. The sensor 66 may output a signal to the controller 68 indicative of the temperature of the conduits 74 of the HRSG 34.

It should be appreciated that alternative embodiments may employ other band-pass filters having other wavelength ranges. Furthermore, certain embodiments may employ a high-pass filter, a low-pass filter, or may omit the filter. In further embodiments, the filter may be incorporated within the viewing port 82. Moreover, while a thermal radiation sensor 66 employing a thermopile is utilized in the present embodiment, it should be appreciated that other detector elements, such as charge-coupled device (CCD), focal-plane array (FPA) or pyrometer, may be employed in alternative embodiments.

The present thermal measurement system 64 also includes an optical focusing device, such as the lens 86, configured to focus the thermal radiation onto the sensor 66. As will be appreciated, the lens 86 may be composed of any suitable material, such as plastic or glass. In certain embodiments, the lens 86 may be combined with the filter 84 into a single element. In further embodiments, the lens 86 may be omitted such that thermal radiation passes directly onto the thermal radiation sensor 66.

The present embodiment also includes a second optical focusing device, such as the illustrated mirror 88. The mirror 88 is configured to direct thermal radiation from the conduit 74 onto the thermal radiation sensor 66. In certain embodiments, the minor 88 may include a substrate (e.g., glass, plastic, etc.) and a reflective coating (e.g., silver, chrome, etc.) disposed onto the substrate. Alternatively, the mirror 88 may be formed from a reflective material, such as polished stainless steel. The present embodiment employs a concave mirror 88 to establish a desired field of view 90. Due to the shape of the minor 88 and the position of the thermal radiation sensor 66, a field of view 90 having an angle 92 is established. For example, in certain embodiments, the angle 92 may be greater than approximately 5, 10, 20, 40, 60, 80, 100, 120, 140 or 160 degrees, or more. In certain embodiments, the thermal radiation sensor 66 may be directed toward the entire cross-section 94 of the HRSG 34 to capture the average temperature of each conduit 74 within the cross-section 94. Consequently, the angle 92 may be selected such that the field of view 90 includes the entire HRSG cross-section 94 at the desired measurement location. As a result, the thermal measurement system 64 may detect a fluid leak, a detached fin and/or an over-pressurization in each conduit 74 within the field of view 90. It should be appreciated that alternative embodiments may employ a convex minor or a substantially flat minor to direct the thermal radiation toward the sensor 66. In further embodiments, the mirror 88 may be omitted, and the thermal radiation sensor 66 may be directed toward the conduits 74. In such embodiments, the lens 86, if present, may serve to establish a desired field of view 90 based on the shape and optical properties of the lens 86.

As previously discussed, the present thermal radiation sensor 66 includes a thermopile configured to convert detected thermal radiation into an output signal. Because the thermopile includes multiple thermocouples connected in series, the thermopile outputs an electrical signal having a magnitude proportional to a temperature of the region within the field of view 90. The sensor 66 may output a signal to the controller 68 indicative of the temperature of the conduits 74 within the HRSG 34. The controller 68 is configured to receive this signal, and to determine an average temperature of the conduits 74 within the HRSG cross-section 94 based on the signal (e.g., via a look-up table, an algorithm, etc.). In the present embodiment, the controller 68 is communicatively coupled to a user interface 70 including a display 96 and an alarm 98. The display 96 is configured to present a graphical representation of the temperature detected by the thermal radiation sensor 66 as a function of time.

As illustrated, the display 96 includes a graph 100 having an x-axis 102 representative of time, and a y-axis 104 representative of temperature. As previously discussed, the sensor 66 is configured to output a signal indicative of the average temperature of conduits 74 within the field of view 90. In the present embodiment, the graph 100 includes a curve 106 that represents the average conduit temperature as a function of time. The graph 100 also includes a dashed line 108 indicative of the time-averaged temperature of the conduits 74. As will be appreciated, exhaust gas temperature may vary across the cross-section 94 of the HRSG 34. Consequently, certain conduits 74 may be exposed to temperatures greater than a desired threshold value, thereby resulting in excessive steam pressure within the conduits 74. As previously discussed, the excessive steam pressure may induce premature wear of the conduits 74 and/or other components within the HRSG 34. Therefore, the graph 100 includes an upper threshold value 110 indicative of a maximum desired conduit temperature. If the curve 106 crosses the upper threshold value 110, excessive steam pressure may be present within at least one conduit 74 within the field of view 90.

Conversely, if a fin 76 at least partially detaches from a conduit 74, the average temperature within the field of view 90 will decrease due to reduced heat transfer between the exhaust gas 32 and the conduit 74. Similarly, buildup of particulate matter (e.g., dirt, unburned hydrocarbons, etc.) on the conduits 74 may also reduce the temperature of the conduits 74. In addition, if a crack develops within a conduit 74, water may leak into the exhaust gas flow, thereby resulting in decreased conduit temperature. Therefore, the graph 100 includes a lower threshold value 112 indicative of a minimum desired conduit temperature. If the curve 106 crosses the lower threshold value 112, efficiency of the HRSG 34 may be reduced due to decreased heat transfer between the exhaust gas 32 and the water within the conduits 74.

In the illustrated embodiment, a single thermal radiation sensor 66 is directed toward the entire cross-section 94 of the HRSG 34. Consequently, the sensor 66 will receive thermal radiation indicative of an average temperature of each conduit 74 within the field of view 90. However, alternative embodiments may employ multiple sensors 66, with each sensor 66 configured to direct a field of view 90 toward a different region of the HRSG cross-section 94. For example, in certain embodiments, each sensor 66 may be configured to measure the thermal radiation of a single conduit 74. In such embodiments, the controller 68 may be configured to identify which conduit 74 is experiencing a temperature outside of the desired range, thereby further facilitating maintenance operations. In further embodiments, each sensor 66, of a multi-sensor thermal measurement system 64, may monitor 2, 3, 4, 5, 6, 7, 8, or more conduits 74 within the field of view 90.

If the temperature increases above the upper threshold value 110 or decreases below the lower threshold value 112, the controller 68 may activate the alarm 98 within the user interface 70. As previously discussed, the alarm 98 may be an audible alarm and/or a visual alarm configured to alert an operator of the detected condition. The operator may then take appropriate corrective action to resolve the detected condition. In addition, the controller 68 and/or the user interface 70 may be communicatively coupled to the power generation system 10, and configured to decrease and/or terminate fluid flow through the HRSG 34 upon detection of a conduit temperature outside of the desired range. For example, in certain embodiments, if the conduit temperature exceeds a first upper threshold value, the controller 68 may reduce turbine engine power, thereby decreasing flow through the HRSG 34. If the temperature exceeds a second upper threshold value, higher than the first upper threshold value, the controller 68 may activate a valve to bypass the HRSG 34, thereby terminating flow through the HRSG 34. As will be appreciated, bypassing the HRSG 34 may decrease power generation efficiency, but may still enable the power generation system 10 to provide electricity to consumers.

While the thermal measurement system 64 is described above with reference to an HRSG 34, it should be appreciated that the thermal measurement system 64 may be employed to detect conduit temperatures within other heat exchangers, such as those found within a gasifier, a synthetic gas cooler or a gas treatment unit. For example, the thermal measurement system 64 may be utilized to detect conduit temperatures within the condenser 54. Similar to the HRSG 34, the condenser 54 includes multiple conduits configured to convey a secondary fluid, such as water, in a direction crosswise to the flow of steam through the condenser 54. As the steam flows across the conduits, heat from the steam is transferred to water 56, thereby condensing the steam into water 58. Similar to the HRSG 34, an excessively hot steam flow through the condenser 54 may result in over-pressurization of the conduits. In addition, leaking conduits may decrease the efficiency of the condenser 54. Consequently, the thermal measurement system 64 may detect such faults within the condenser 54, thereby facilitating condenser maintenance operations.

Figure 3:
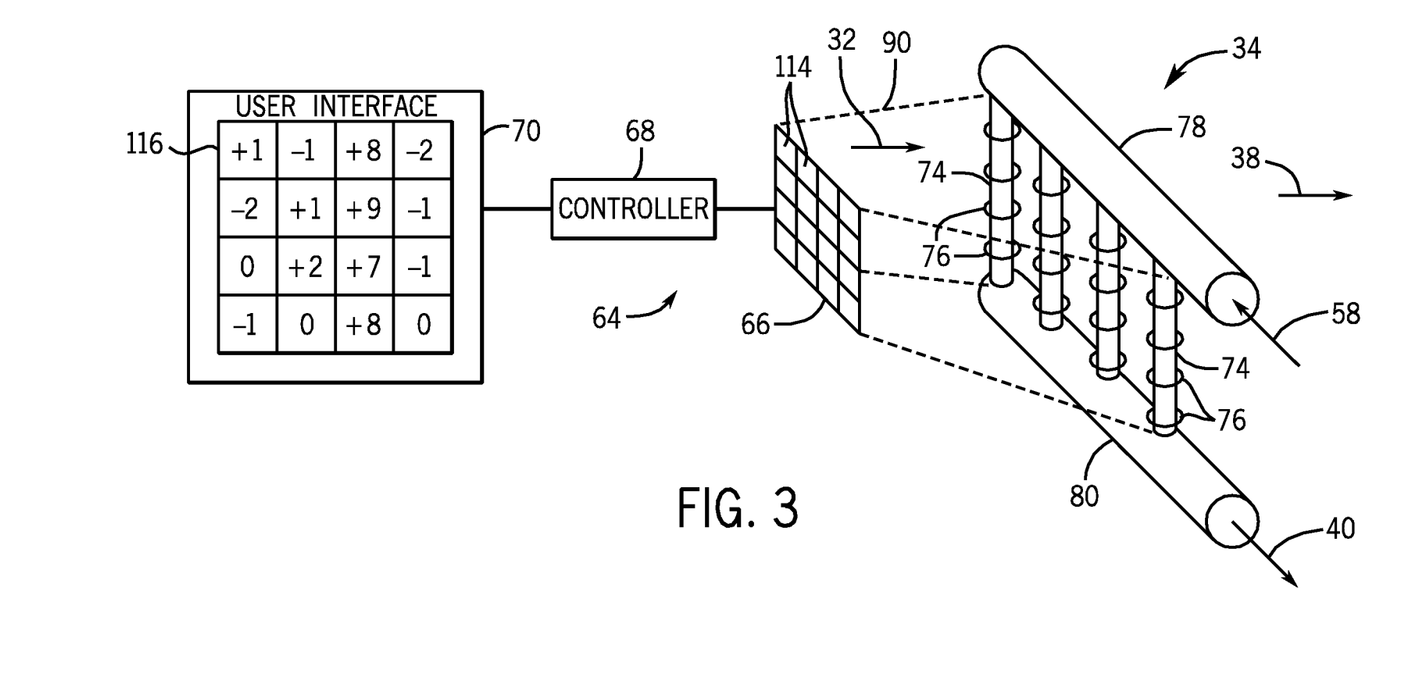
FIG. 3 is a schematic diagram of an embodiment of the thermal measurement system directed toward a cross-section of the HRSG upstream of the fluid conduits.

FIG. 3 is a schematic diagram of an embodiment of the thermal measurement system 64 directed toward a cross-section of the HRSG 34 upstream of the fluid conduits 74. As previously discussed, the exhaust gas 32 flows into the HRSG 34 in the downstream direction 72. The HRSG 34 includes multiple conduits 74 configured to convey a secondary fluid, such as water, in a direction crosswise (e.g., substantially perpendicular) to the downstream direction 72. As the exhaust gas 32 flows across the conduits 74, heat is transferred from the exhaust gas 32 to the water, thereby producing steam. In the present embodiment, the water 58 is supplied to the conduits 74 by the first manifold 78 and the steam 40 is expelled through the second manifold 80. The steam 40 then flows toward the steam turbine 42, and the cooled exhaust gas flows toward the stack 36. While four conduits 74 are employed in the present embodiment, it should be appreciated that more or fewer conduits 74 may be utilized in alternative embodiments. For example, certain HRSGs 34 may include more than approximately 50, 75, 100, 125, 150, 175, 200, or more conduits 74.

The illustrated thermal radiation sensor 66 is directed toward the conduits 74 such that the entire cross-section of the HRSG 34 falls within the field of view 90 of the sensor 66. In this manner, the sensor 66 may monitor the temperature of each conduit 74, thereby ensuring that substantially any temperature variation at a particular measurement location will be detected. As previously discussed, the thermal radiation sensor 66 may include a single thermopile configured to measure an average temperature of the conduits 74 within the field of view 90. However, in the illustrated embodiment, the thermal radiation sensor 66 includes multiple thermopile elements 114, with each thermopile element directed toward a different region of the cross-section 94. In this configuration, the thermal radiation sensor 66 may output a signal indicative of the temperature of each region such that the controller 68 may establish a multi-dimensional temperature profile (e.g., two-dimensional or three-dimensional profile) of the cross-section 94.

In the present embodiment, the thermal radiation sensor 66 includes a 4×4 matrix of thermopile elements 114. In this configuration, each column of the thermal radiation sensor 66 may be directed toward a respective conduit 74 such that a temperature profile of each conduit 74 may be independently monitored. However, it should be appreciated that alternative thermal radiation sensors 66 may include more or fewer thermopile elements 114, forming an N×N or M×N matrix. For example, certain thermal radiation sensors 66 may include approximately 1 to 1000, or more rows and/or approximately 1 to 1000, or more columns. In addition, while the illustrated radiation sensor includes a rectangular array of elements 114, it should be appreciated that certain thermal radiation sensors 66 may include a circular, elliptical or polygonal shaped array of elements 114. It should also be appreciated that alternative thermal radiation sensors (e.g., CCD, FPA, pyrometer, etc.) may form elements of the thermal radiation sensor 66. Furthermore, as previously discussed, the sensor 66 may include multiple N×N or M×N element arrays directed toward various two-dimensional regions of the HRSG 34, thereby enabling the controller 68 to generate a three-dimensional temperature profile of the conduits 74 within the HRSG 34. For example, 1, 2, 3, 4, 5, 6, 7, 8, 9, 10, or more two-dimensional arrays may be tightly spaced along the flow direction to establish an L×N×N or L×M×N three-dimensional sensor 66.

As will be appreciated, the overall sensitivity of the thermal measurement system 64 may be dependent on the sensitivity of the thermopile elements 114, the accuracy of the thermal radiation sensor 66, optical and/or electrically noise within the system 64, the accuracy of a signal conditioner within the controller 68, the quality of the thermal radiation sensor optics, the field of view of each thermopile element and/or the techniques used by the controller 68 to compute temperature, among other factors. For example, in certain embodiments, the thermal measurement system 64 may be able to identify temperature variations of less than approximately 2, 1, 0.75, 0.5, or 0.25 degrees Celsius, or less. Consequently, the thermal measurement system 64 may detect thermal variations within the HRSG conduits 74 prior to significant decreases in HRSG efficiency, thereby maintaining the efficiency of the power generation system 10. Because the sensitivity of the thermal measurement system 64 is at least partially dependent on the field of view of each thermopile element 114, it should be appreciated that thermal measurement system sensitivity may be enhanced by employing a larger number of thermopile elements 114. In this manner, each thermopile element 114 will monitor a smaller region of the fluid flow, thereby increasing the sensitivity of each element 114.

Similar to the thermal measurement system 64 described above with reference to FIG. 2, the illustrated thermal measurement system 64 includes a user interface 70 communicatively coupled to the controller 68. The illustrated user interface 70 includes a numerical display 116 configured to present a numerical representation of the temperature of each region within the field of view 90 of the sensor 66. In the present embodiment, the display 116 is configured to output a temperature difference between each monitored region and an average temperature of the cross-section 94. It should be appreciated, that alternative embodiments may include a display 116 configured to present the absolute temperature of each region. In the present embodiment, the temperature values are shown in degrees Celsius.

In the present embodiment, the controller 68 may be configured to detect an excessive temperature within one conduit 74 by comparing the temperature difference between each monitored region and the average temperature of the field of view 90 to a threshold value. In the illustrated embodiment, the threshold value is 5 degrees Celsius, which corresponds to the maximum desired temperature variation between conduits 74. As previously discussed, an excessive temperature within one conduit 74 may result in over-pressurization, thereby reducing the operational life of the conduit 74 and/or other components (e.g., manifolds, connectors, etc.) within the HRSG 34. As will be appreciated, a higher or lower threshold value may be employed in alternative embodiments. Because the illustrated thermal radiation sensor 66 includes four rows of thermopile elements 114, each row measures the temperature of a respective conduit 74. As illustrated, each temperature within the left column of the display 116 indicates a temperature difference of less than 5 degrees Celsius from the average temperature. Similarly, each temperature difference within the right column and the column second from the left are within the 5 degree tolerance. Consequently, the display 116 indicates that the temperatures of corresponding conduits 74 are within the desired tolerance. In contrast, the temperature measurements corresponding to the second conduit 74 from the right indicate that the conduit 74 is significantly warmer than the surrounding conduits 74. Specifically, the temperature of each region corresponding to the second conduit 74 from the right is more than 5 degrees Celsius higher than the average temperature. Therefore, the controller 68 will detect the excessive temperature of the conduit 74, and activate an alarm, reduce fluid flow into the HRSG 34 and/or terminate flow to the HRSG 34. In alternative embodiments, the temperature of each conduit 74 may be directly compared to a threshold value to determine whether each conduit 74 is over-pressurized.

In addition, the controller 68 may be configured to detect an excessively low temperature within one conduit 74 by comparing the temperature difference between each monitored region and the average temperature of the field of view 90 to a threshold value. For example, if the temperature of one conduit 74 decrease more than 5 degrees Celsius below the average temperature of the field of view 90, the controller 68 may activate an alarm to alert an operator, reduce fluid flow into the HRSG 34 and/or terminate flow to the HRSG 34. As previously discussed, an excessively low temperature of one conduit 74 may be indicative of a fault within the HRSG 34. For example, the temperature of a conduit 74 will be lower than desired if one or more fins 76 at least partially detach from the conduit 74. In addition, if a crack develops within the conduit 74, the conduit 74 will leak water, thereby further decreasing the temperature of the conduit 74. Furthermore, buildup of particulate matter (e.g., dirt, unburned hydrocarbons, etc.) on the conduits 74 may reduce the temperature of the conduits 74. By detecting such conditions, the controller 68 may alert an operator to take corrective action and/or may reduce/terminate fluid flow into the HRSG 34 before the power generation system 10 experiences a significant loss in efficiency.

In further embodiments, the controller 68 may be configured to analyze the temperature of each conduit 74 as a function of time to identify faults within the HRSG 34. For example, as previously discussed, excessive conduit temperature may result in over-pressurization of the conduit 74. As will be appreciated, such over-pressurization may induce a crack to form within the conduit 74. Because the crack will enable water to leak from the conduit 74, the temperature of the conduit 74 will be reduced. Consequently, the controller 68 may be configured to flag an excessively hot conduit 74, and identify a leak within the conduit 74 when the temperature subsequently drops. Such a configuration may detect a leak more accurately than monitoring the instantaneous temperature of each conduit 74. In addition, the temperature of each conduit 74 as a function of time may be utilized within damage models to predict the reliability of the HRSG 34 and/or to estimate the duration between maintenance operations.

Figure 4:
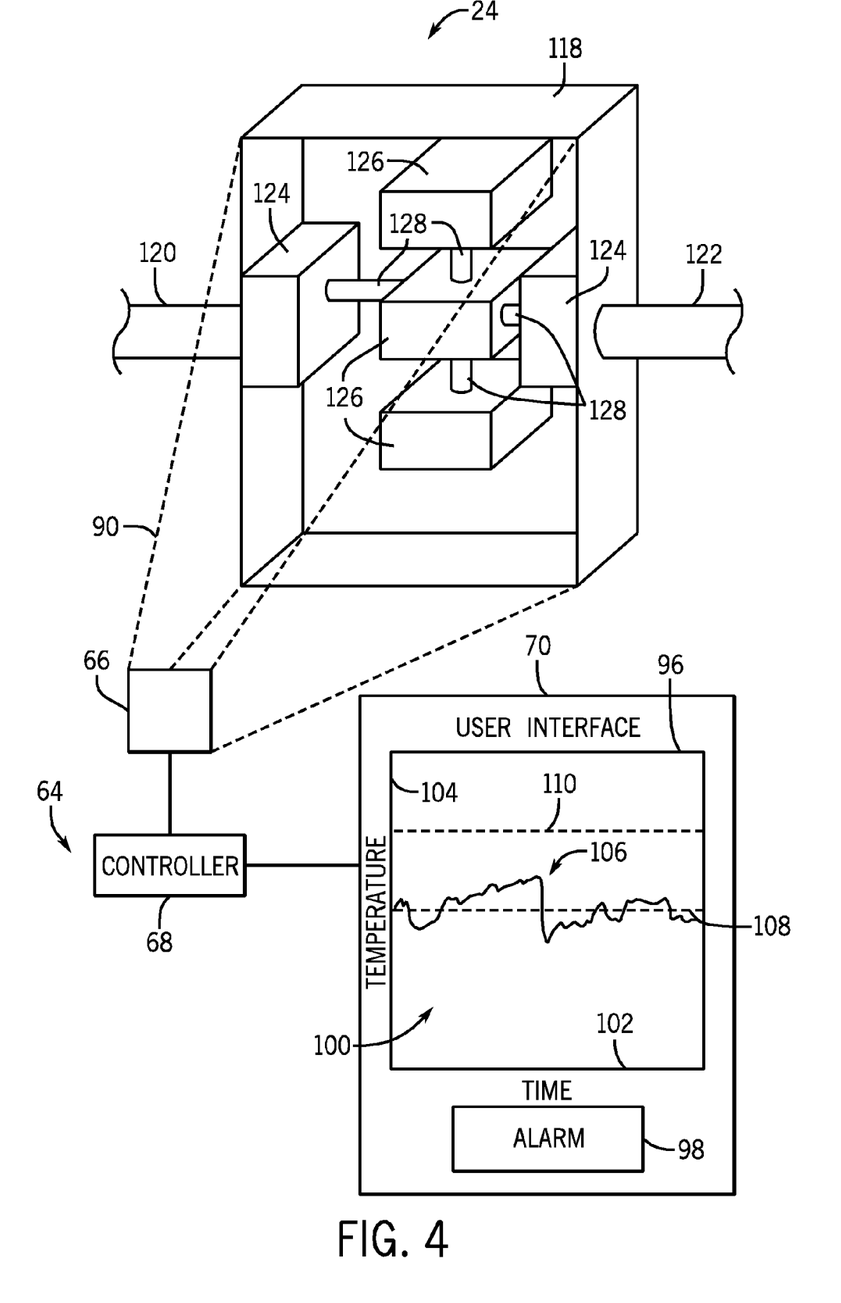
FIG. 4 is a schematic diagram of an embodiment of the thermal measurement system directed toward an interior of the switchgear.

FIG. 4 is a schematic diagram of an embodiment of the thermal measurement system 64 directed toward an interior of the switchgear 24. As previously discussed, the switchgear 24 is configured to regulate operation of various electrical systems, such as electrical output from the generator 22 and/or an electrical starter motor for the gas turbine engine 12. As illustrated, the switchgear 24 includes an electrical enclosure 118 coupled to a first electrical conductor 120 and a second electrical conductor 122. In the present embodiment, each electrical conductor 120 and 122 is electrically coupled to a respective connector 124 within the enclosure 118. The connectors 124, in turn, are electrically coupled to components 126 within the enclosure 118 via internal conductors 128. As will be appreciated, the components 126 may include various switches, circuit breakers and/or other circuits configured to regulate electrical current flow between the first conductor 120 and the second conductor 122. For example, the components 126 may enable an operator to disconnect the generator 22 from the electrical power grid 30 if a fault is detected within the power generation system 10. While a single enclosure 118 is illustrated in the present embodiment, it should be appreciated that multiple enclosures may be employed within other switchgear configurations. For example, certain switchgears 24 may include 1, 2, 3, 4, 5, 6, 7, 8, or more electrical enclosures 118.

As illustrated, the thermal radiation sensor 66 is directed toward an interior of the electrical enclosure 118. In the present embodiment, the field of view 90 includes the entire interior of the enclosure 118, including the connectors 124, the components 126 and the internal conductors 128. Consequently, the thermal measurement sensor 66 will output a signal indicative of the average temperature of the interior of the enclosure 118. While the illustrated thermal radiation sensor 66 includes a single thermopile configured to output a single temperature, it should be appreciated that alternative embodiments may include a sensor 66 having an array of thermopile elements, such as those described above with reference to FIG. 3. In such embodiments, the sensor 66 will measure the temperature within various regions of the electrical enclosure 118, thereby providing additional information regarding the temperature profile of the enclosure interior.

As will be appreciated, the thermal radiation sensor 66 may be mounted within any suitable location to capture radiation emitted from the interior of the enclosure 118. For example, in certain embodiments, the sensor 66 may be mounted within the enclosure 118, thereby providing the sensor 66 with a direct line of sight to the components 126. By way of example, the sensor 66 may be mounted on an inner surface of a door configured to seal the enclosure 118. In such a configuration, the sensor 66 may provide a continuous temperature signal to the controller 68 while the electrical components 126 are sealed within the enclosure 118. In further embodiments, the sensor 66 may be mounted outside of the enclosure 118, thereby protecting the thermal measurement system 64 from potentially high temperatures within the enclosure 118. In such embodiments, the electrical enclosure 118 may include a viewing port configured to enable the thermal radiation sensor 66 to receive thermal radiation emitted by the components 126 within the enclosure 118. As previously discussed, the viewing port may be composed of a material that is substantially transparent to the wavelengths measured by the thermal radiation sensor 66 (e.g., infrared radiation).

In the present embodiment, the controller 68 is configured to identify a fault among the components 126 of the switchgear 24 if a temperature of the interior of the electrical enclosure 118 exceeds a threshold value. As will be appreciated, an electrical fault (e.g., short circuit, sneak path, ground fault, etc.) may generate heat due to electrical current flowing through a material (e.g., air) having a high electrical resistance. Consequently, the controller 68 may be configured to compare the temperature of the enclosure interior to a threshold value to identify such a fault. For example, the illustrated user interface 70 includes the display 96 having the graph 100. In the illustrated embodiment, the curve 106 indicates the temperature of the enclosure interior as a function of time. If the temperature increases above the upper threshold value 110, the controller 68 may activate an alarm 98 within the user interface 70 to warn an operator of the condition. In addition, the controller 68 may be configured to reroute electrical power through an alternative enclosure 118 of the switchgear 24 and/or through an alternative switchgear, thereby bypassing the components 126 having the fault.

As previously discussed, certain switchgears 24 may include multiple electrical enclosures 118 including the connectors 124, the components 126 and the internal conductors 128. In such configurations, a thermal radiation sensor 66 may be directed toward each enclosure 118 to independently monitor enclosure temperature. In addition, the controller 68 may be configured to compare the temperature difference between enclosures 118 to a threshold value to identify a fault within one or more enclosures 118. For example, the controller 68 may be configured to compute an average temperature across each enclosure 118 within the switchgear 24. The controller 68 may then compare the temperature of each enclosure 118 to the average temperature to identify an electrical fault. For example, if the temperature of one electrical enclosure 118 is higher than the average temperature by more than a first threshold value, then an electrical fault may be present within the enclosure 118. Conversely, if the temperature of one enclosure 118 is lower than the average temperature by more than a second threshold value, then the electrical enclosure 118 may not be operating at a desired capacity. For example, a lower enclosure temperature may be indicative of an electrical fault within the switchgear 24 that limits electrical power to a particular electrical enclosure 118.

Because the thermal measurement system 64 is configured to continuously monitor the temperature of the switchgear 24 and to automatically identify an electrical fault based on the temperature, manually scanning the switchgear with a handheld infrared camera prior to activating the power generation system 10 may be obviated. Consequently, the operational costs associated with startup operations may be significantly reduced. In addition, electrical faults may be detected during operation of the power generation system 10, not just during startup procedures. While the thermal measurement system 64 is described above with reference to a switchgear 24, it should be appreciated that the thermal measurement system 64 may be employed to detect faults within other electrical enclosures, such as fuse panels, circuit breaker housings, power distribution centers, and industrial control centers, among other enclosures.

Figure 5:
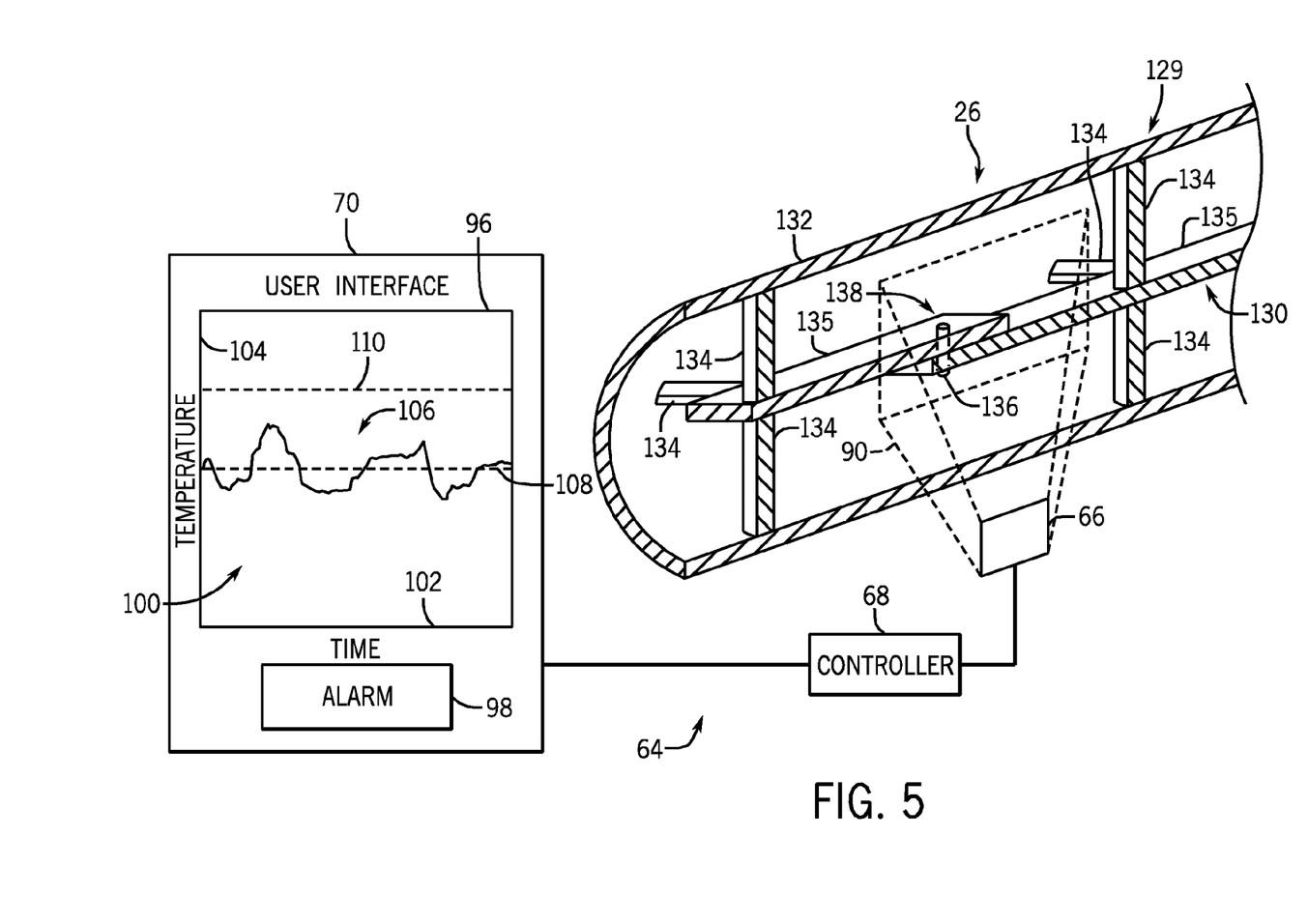
FIG. 5 is a schematic diagram of an embodiment of the thermal measurement system directed toward a junction between two electrical conductors within a conduit of the isolated phase bus.

FIG. 5 is a schematic diagram of an embodiment of the thermal measurement system 64 directed toward a junction between two electrical conductors within a conduit of the isolated phase bus 26. As previously discussed, the isolated phase bus 26 includes three electrical conduits 129 configured to individually transfer each phase of the three-phase power output by the generator 22 to the GSU 28. Each electrical conduit 129 of the isolated phase bus 26 includes an electrical conductor assembly 130 disposed within an enclosure 132. The electrical conductor assembly 130 is electrically isolated from the enclosure 132 by a series of insulators 134 which also serve to support the electrical conductor assembly 130 within the enclosure 132. The electrical conductor assembly 130 includes a series of conductors 135 coupled to one another by fasteners, such as the illustrated bolt 136. In this configuration, the possibility of electrically grounding the conductor assembly 130 and/or inductive interference between conduits 129 may be substantially reduced or eliminated.

While the present embodiment employs an enclosure 132 having a circular cross-section, it should be appreciated that alternative embodiments may include enclosures having alternative cross-sectional shapes (e.g., polygonal, elliptical, etc.). In addition, while the present embodiment employs four insulators at each axial location along the conduit 129, it should be appreciated that alternative embodiments may include more or fewer insulators. For example, certain embodiments may employ 1, 2, 3, 4, 5, 6, 7, 8, or more insulators 134 at each axial location. Furthermore, while the present embodiment employs conductors 135 having a rectangular cross-section, it should be appreciated that alternative embodiments may include conductors having a round cross-section, a hollow rectangular cross-section, or a hollow round cross-section, among other cross-sectional shapes.

As illustrated, the thermal radiation sensor 66 is directed toward a junction 138 between the conductors 135. In the present embodiment, the field of view 90 includes the entire region of overlap between the two electrical conductors 135. Consequently, the thermal radiation sensor 66 will output a signal indicative of the average temperature of the junction 138. While the illustrated thermal radiation sensor 66 includes a single thermopile configured to output a single temperature, it should be appreciated that alternative embodiments may include a sensor 66 having an array of thermopile elements, such as those described above with reference to FIG. 3. In such embodiments, the sensor 66 will measure the temperature within various regions of the junction 138, thereby providing additional information regarding the temperature profile of the connection between conductors 135.

As will be appreciated, the thermal radiation sensor 66 may be mounted at any suitable location to capture radiation emitted from the junction 138 between electrical conductors 135. For example, in certain embodiments, the sensor 66 may be mounted within the enclosure 132, thereby providing the sensor 66 with a direct line of sight to the junction 138. By way of example, the sensor 66 may be mounted on an inner surface of the enclosure 132 perpendicular to a plane aligned with the interface between conductors 135. In further embodiments, the sensor 66 may be mounted outside of the enclosure 132, thereby protecting the thermal measurement system 64 from potentially high temperatures within the conduit 129. In such embodiments, the enclosure 132 may include a viewing port configured to enable the thermal radiation sensor 66 to receive thermal radiation emitted by the junction 138. As previously discussed, the viewing port may be composed of a material that is substantially transparent to the wavelengths measured by the thermal radiation sensor 66 (e.g., infrared radiation).

In the present embodiment, the controller 68 is configured to identify separation of the conductors 135 at the junction 138 if a temperature of the junction 138 exceeds a threshold value. As will be appreciated, the electrical conductors 135 may at least partially separate from one another over time, thereby generating heat at the junction 138 and decreasing power transfer efficiency between the generator 22 and the GSU 28. Consequently, the controller 68 may be configured to compare the temperature of the junction 138 to a threshold value to identify such conductor separation. For example, the illustrated user interface 70 includes the display 96 having the graph 100. In the illustrated embodiment, the curve 106 indicates the temperature of the junction 138 as a function of time. If the temperature increases above the upper threshold value 110, the controller 68 may activate an alarm 98 within the user interface 70 to warn an operator of the condition. In addition, the controller 68 may be configured to reroute electrical power through an alternative conduit 129 of the isolated phase bus 26 and/or through an alternative isolated phase bus, thereby bypassing the junction 138 having separated conductors 135.

As previously discussed, the isolated phase bus 26 includes three electrical conduits 129 configured to individually transfer each phase of the three-phase power output by the generator 22 to the GSU 28. In certain embodiments, a thermal radiation sensor 66 may be directed toward one or more junctions 138 within each conduit 129 to independently monitor conduit temperature. In such embodiments, the controller 68 may be configured to compare the temperature difference between conduits 129 to a threshold value to identify a fault within one conduit 129. For example, the controller 68 may be configured to compute an average temperature across each conduit 129 within the isolated phase bus 26. The controller 68 may then compare the temperature of each conduit 129 to the average temperature to identify an electrical fault. For example, if the temperature of one electrical conduit 129 is higher than the average temperature by more than a first threshold value, then an electrical fault may be present within the conduit 129. Conversely, if the temperature of one conduit 129 is lower than the average temperature by more than a second threshold value, then the electrical conduit 129 may not be operating at a desired capacity. For example, a lower conduit temperature may be indicative of an electrical fault within the power generation system 10 that limits electrical power to a particular phase of the isolated phase bus 26.

Because the thermal measurement system 64 is configured to continuously monitor the temperature of the junction 138 and to automatically identify conductor separation based on the temperature, a decrease in transfer efficiency through the isolated phase bus 26 may be quickly identified. Consequently, rerouting electrical power as soon as the separation is detected may ensure efficient operation of the power generation system 10. While the thermal measurement system 64 is described above with reference to an isolated phase bus 26, it should be appreciated that the thermal measurement system 64 may be employed to detect separation between other electrical conductors, such as bus bars utilized within switchgears, distribution boards or substations, for example. In addition, the thermal measurement system 64 may be utilized to monitor transformer connections, bus duct connections, generator connections and/or switchgear connections.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
a radiation sensor comprising a plurality of thermopile arrays each configured to direct a field of view toward a respective two-dimensional region of a heat recovery steam generator (HRSG), wherein each thermopile array comprises a two-dimensional array of thermopile elements, the HRSG comprises at least one conduit, and the radiation sensor is configured to output a signal indicative of a three-dimensional temperature profile of the at least one conduit; and
a controller communicatively coupled to the radiation sensor, wherein the controller is configured to determine the three-dimensional temperature profile based on the signal, and to compare at least one portion of the three-dimensional temperature profile to a threshold value.

2. The system of claim 1, wherein the threshold value is indicative of a maximum desired operating temperature of the at least one conduit.

3. The system of claim 1, wherein the threshold value is indicative of a fluid leak within the at least one conduit.

4. The system of claim 1, comprising a plurality of fins coupled to the at least one conduit, wherein the threshold value is indicative of at least partial separation of at least one fin from the at least one conduit.

5. The system of claim 1, wherein the field of view is directed toward a viewing port into the HRSG, and the viewing port is substantially transparent to wavelengths measured by the radiation sensor.

6. The system of claim 1, comprising: a second radiation sensor configured to direct a second field of view toward a region including at least one junction between a plurality of electrical conductors, and to output a second signal indicative of a second temperature of the region, wherein the second radiation sensor is communicatively coupled to the controller;
wherein the controller is configured to detect separation of the plurality of electrical conductors at the at least one junction based on the second signal.

7. A system comprising:
a radiation sensor comprising a plurality of thermopile arrays each configured to direct a field of view toward a respective two-dimensional region of an interior of an electrical enclosure containing a plurality of components, wherein each thermopile array comprises a two-dimensional array of thermopile elements, and the radiation sensor is configured to output a signal indicative of a three-dimensional temperature profile of at least one component of the plurality of components contained in the interior of the electrical enclosure; and
a controller communicatively coupled to the radiation sensor, wherein the controller is configured to determine the three-dimensional temperature profile based on the signal, and to compare at least one portion of the three-dimensional temperature profile to a threshold value to detect an electrical fault among at least one component of the plurality of components.

8. The system of claim 7, wherein the field of view is directed toward a viewing port into the electrical enclosure, and the viewing port is substantially transparent to wavelengths measured by the radiation sensor.

9. The system of claim 7, comprising the electrical enclosure, wherein the radiation sensor is mounted within the interior of the electrical enclosure.

10. The system of claim 7, comprising an optical focusing device configured to focus thermal radiation from the interior of the electrical enclosure onto the radiation sensor.

11. A system comprising:
a radiation sensor comprising a plurality of thermopile arrays each configured to direct a field of view toward a respective two-dimensional region, the region including at least one junction between a plurality of electrical conductors, wherein each thermopile array comprises a two-dimensional array of thermopile elements, and the radiation sensor is configured to output a signal indicative of a three-dimensional temperature profile of the region; and
a controller communicatively coupled to the radiation sensor, wherein the controller is configured to determine the three-dimensional temperature profile based on the signal, and to compare at least one portion of the three-dimensional temperature profile to a threshold value to detect separation of the plurality of electrical conductors at the at least one junction.

12. The system of claim 11, comprising an isolated phase bus, a bus bar, a transformer connection, a bus duct connection, a generator connection or a switchgear connection having the at least one junction between the plurality of electrical conductors.

13. The system of claim 11, comprising an enclosure containing the at least one junction between the plurality of electrical conductors, wherein the field of view is directed toward a viewing port into the enclosure, and the viewing port is substantially transparent to wavelengths measured by the radiation sensor.

14. The system of claim 11, comprising a user interface communicatively coupled to the controller, wherein the controller is configured to activate an alarm within the user interface upon detection of separation of the plurality of electrical conductors at the at least one junction.

* * * * *